United States Patent
Erlenmaier et al.

(10) Patent No.: US 9,861,918 B2
(45) Date of Patent: Jan. 9, 2018

(54) FILTER MEDIUM

(71) Applicant: Sefar AG, Heiden (CH)

(72) Inventors: Isabell Erlenmaier, St. Gallen (CH); Christoph Maurer, Zurich (CH); Christian Gurtner, Schachen b. Reute (CH); Christian Dietmayer, Lindau (DE)

(73) Assignee: Sefar AG, Heiden (CH)

( * ) Notice: Subject to any disclaimer, the term of this patent is extended or adjusted under 35 U.S.C. 154(b) by 102 days.

(21) Appl. No.: 14/784,793

(22) PCT Filed: Feb. 17, 2014

(86) PCT No.: PCT/EP2014/053015
§ 371 (c)(1),
(2) Date: Oct. 15, 2015

(87) PCT Pub. No.: WO2014/170046
PCT Pub. Date: Oct. 23, 2014

(65) Prior Publication Data
US 2016/0074788 A1    Mar. 17, 2016

(30) Foreign Application Priority Data

Apr. 15, 2013 (DE) .................... 20 2013 003 527 U

(51) Int. Cl.
*B01D 39/08* (2006.01)
*B01D 33/048* (2006.01)
*B01D 33/04* (2006.01)
*D03D 1/00* (2006.01)
*D03D 11/00* (2006.01)
*D03D 13/00* (2006.01)
*D03D 15/00* (2006.01)

(52) U.S. Cl.
CPC .......... *B01D 39/08* (2013.01); *B01D 33/042* (2013.01); *B01D 33/048* (2013.01); *D03D 1/00* (2013.01); *D03D 11/00* (2013.01); *D03D 13/004* (2013.01); *D03D 15/0094* (2013.01); *B01D 2239/0654* (2013.01); *D10B 2505/04* (2013.01)

(58) Field of Classification Search
CPC .... B01D 39/08; B01D 33/048; B01D 33/042; B01D 2239/0654; D03D 11/00; D03D 13/004; D03D 15/0094; D03D 1/00; D10B 2505/04
USPC ................ 210/471, 490, 491, 499, 400, 401
See application file for complete search history.

(56) References Cited

U.S. PATENT DOCUMENTS 6,223,780 B1 * 5/2001 Kaldenhoff ............ D03D 11/00
139/383 A
2003/0111405 A1    6/2003 Mueller et al.

FOREIGN PATENT DOCUMENTS

| DE | 10 03 185 B | 2/1957 |
| DE | 26 27 283 A1 | 12/1977 |
| EP | 1 129 755 A1 | 9/2001 |
| EP | 2 500 077 A1 | 9/2012 |

OTHER PUBLICATIONS

Machine translation of EP2500077.*
Translation of International Preliminary Report on Patentability(Chapter II); PCT/EP2014/053015.
International Search Report issued in Application No. PCT/EP2014/053015, dated Jul. 25, 2014.

* cited by examiner

*Primary Examiner* — Madeline Gonzalez
(74) *Attorney, Agent, or Firm* — Studebaker & Brackett PC

(57) ABSTRACT

The invention relates to a filter medium having a filter fabric on an upper side and a support fabric on a lower side, wherein the filter fabric and the support fabric have different yarns and together take the form of a double weave, wherein the filter fabric has a pore count of 4000/cm2 or greater, preferably 5000/cm2.

10 Claims, No Drawings

FILTER MEDIUM

The invention relates to a filter medium having a filter fabric on an upper side and a supporting fabric on a lower side, wherein the filter fabric and the supporting fabric have different yarns and are jointly designed as a double-weave fabric, in accordance with the preamble of claim 1.

Double-weave fabrics of such type have long been in use for filtration. Normally, in such a double-weave fabric the supporting fabric is of a coarser-meshed weave than the filter fabric arranged thereon. The filter fabric serves for the solid-liquid-separation, for instance for application on filter plates of filter presses or on belt filters. In such filtration means a high filtration pressure is partially present, as a result of which liquid penetrates the pores of the filter fabric while solid particles are retained by the filter fabric.

The supporting fabric has the primary task of increasing the mechanical stability of the filter medium when filtration pressures are applied. In a double-weave fabric the filter fabric and the supporting fabric are interwoven. In this, the threads or yarns of the coarse supporting fabric can have an influence on the structure of a finer filter fabric. Therefore, such double-weave fabrics with filter fabric and supporting fabric are primarily used in those applications where fine pores are required.

For fine filtration it is known that a filter membrane or a fine fabric is bonded adhesively onto a supporting fabric. However, adhesive bonds prove to be vulnerable under harsh filtration operating conditions, and, in addition, depending on the filtration task certain adhesives cannot be used unreservedly on account of their chemical resistance. Moreover, adhesive bonding frequently leads to a clogging of pores so that the filtration performance of the filter medium is reduced.

The invention is based on the object to provide a filter medium, which is robust on the one hand and can also be used for fine filtration on the other hand.

According to the invention the object is achieved by a filter medium having the features of claim 1. Preferred embodiments of the filter medium according to the invention are stated in the dependent claims.

According to the invention the filter medium is characterized in that the filter fabric has a pore count of 4,000/cm$^2$ and greater, preferably 5,000/cm$^2$.

According to the invention a double-weave fabric having an extremely fine filter fabric with at least 4,000 pores/cm$^2$ is created. Thus, the filter medium can also be employed for ultra-fine filtration. By designing the filter fabric with the supporting fabric as a double-weave fabric a high stability is achieved without requiring any adhesives for this. Within the meaning of the invention, filter and filtration are to be understood in a broad sense and are not limited to a cake-forming filtration. In fact, a sieving or classification are also included for example.

A preferred embodiment of the invention resides in the fact that the density of the warp threads of the filter fabric is higher at least by the factor of 5, preferably by the factor of 10, than a density of the warp threads of the supporting fabric. Hence, two warp thread systems are provided, in which case the warp thread system of the filter fabric has more than five times as many warp threads per length unit than the warp thread system of the supporting fabric. This permits, on the one hand, an extremely fine design of the filter fabric and, on the other hand, the arrangement of a highly robust supporting fabric.

According to the invention it is particularly preferred that a ratio of the diameter of the warp threads of the supporting fabric to the diameter of the warp threads of the filter fabric is ≥3.5. The diameters of the warp threads of the supporting fabric are therefore at least 3.5 times as large as the diameters of the warp threads of the filter fabric. By preference, at least 70% of the thickness of the filter medium are accounted for by the supporting fabric while the remaining proportion of thickness is constituted by the fine fabric. This ensures that the influence of the supporting fabric on the filtration performance, i.e. on a flow resistance of the filter medium, remains at a low level.

According to a further embodiment variant a particularly advantageous design of the filter medium results from the fact that a ratio of the diameter of the weft thread of the supporting fabric to the diameter of the weft thread of the filter fabric is ≥2.5. Hence, the weft thread of the supporting fabric is also considerably larger than the weft thread of the filter fabric. In principle, the warp threads and the weft threads in the supporting fabric or in the filter fabric can each be designed with the same diameter. By preference, however, the warp threads in the respective fabric section are in each case larger than the diameters of the weft threads in the respective thread section.

To reach a high pore count in the filter fabric, in a further embodiment variant according to the invention it is preferred that the filter fabric and the supporting fabric are connected by way of a further thread system as binding weft or binding warp. In this manner, the larger diameter threads of the supporting fabric are prevented from extending into the upper area of the double-weave fabric and thereby having a negative effect on the fineness and thus the pore count of the filter fabric. The further thread system can be a binding weft or a binding warp that extends between the two partial fabrics of the double-weave fabric. For an especially stable connection a binding weft and a binding warp are also possible as a further thread system. The size of the thread of the further thread system can in particular range between the diameter size of the threads of the filter fabric and the threads of the supporting fabric. By preference, the thread of the further thread system corresponds in size to the size of the warp thread or the weft thread of the filter fabric.

According to a preferred embodiment variant of the invention an especially stable and fine design of the filter fabric is achieved in that the filter fabric has a twill weave or a satin weave. With regard to the supporting fabric, it is preferred in accordance with the invention that the supporting fabric has a twill weave or a plain weave.

Furthermore, a particularly useful design is achieved in that the supporting fabric is exclusively formed of monofilament yarns and that the filter fabric is formed of multifilament yarns and/or monofilament yarns. The yarns or threads are preferably produced of a plastic material, such as polyester. The design of the supporting fabric from the wire-type monofilament yarns offers the advantage that these ensure a high degree of stability and do not fray even when being in long-term use. Depending on the purpose of application the filter fabric can also be formed of monofilament yarns, in which case preferably a design consisting in part or in its entirety of multifilament yarns proves to be of advantage. For instance when used on circulating belt filters the yarn structure consisting of a plurality of fibers can bring about an improved adaptability in the deflecting areas due to the deformation of the multifilament yarns.

In line with the purpose of application of the filter medium advantageous provision is made according to the invention in that the further thread system has a multifilament yarn or a monofilament yarn.

Another advantageous design of the invention resides in the fact that the filter medium has a weight of 300 g/m² and greater. As a result, a particularly stable design of the filter medium is achieved.

By preference, the mesh width of the fine fabric amounts to 5 to 100 μm, by particular preference 5 to 150 μm. On the one hand, this ensures a sufficiently high mechanical stability of the filter fabric and on the other hand media having a sufficiently small solids content can also be filtered. Furthermore, it is useful if the thread count of the fine fabric amounts to 10 to 240, especially advantageous being 40 to 240 threads/cm in the weft and/or warp direction. Preferably, for the filter fabric thread diameters ranging from 20 to 100 μm are used which are especially easy to process from a manufacturing standpoint. Moreover, sufficiently small mesh widths of up to 5 μm can be reached. Furthermore, it is preferred if the fabric thickness of the fine fabric amounts to 40 to 140 μm. This fabric thickness ensures the necessary mechanical strength of the fine fabric along with a minimum possible pressure loss. By comparison, a mesh width of the supporting fabric can lie between 300 and 1,500 μm.

In principle, the filter medium can be fabricated as required for a wide range of different applications. According to the invention it is especially advantageous that the filter medium is provided for a belt filter, with the ends of the elongate, belt-shaped filter medium being connected to form an endless belt. Such belt filters driven in a circulating manner are exposed to high loads due to their dynamic strain. The robust construction of the filter medium according to the invention permits the use on belt filter systems, in which ultra-fine particles have to be separated, for instance when treating cooling liquid in grinding systems.

The invention claimed is:

1. A belt filter having an elongate filter medium, the ends of which are connected to form an endless belt, wherein
the filter medium is designed with a filter fabric on an upper side and a supporting fabric on a lower side,
the filter fabric and the supporting fabric have different yarns and are jointly woven as a double-weave fabric,
in that the filter fabric and the supporting fabric are connected by way of a further thread system as binding weft and/or binding warp, the size of which corresponds to the diameter size of the warp thread or the weft thread of the filter fabric,
in that the supporting fabric has a mesh width ranging between 300 μm and 1500 μm,
in that the filter fabric has a pore count of 5,000/cm² and greater and
in that the supporting fabric amounts to at least 70% of the thickness of the filter medium designed as a double-weave fabric.

2. The belt filter medium according to claim 1, wherein
the density of the warp threads of the filter fabric is higher at least by the factor of 4, preferably by the factor of 10, than a density of the warp threads of the supporting fabric.

3. The belt filter medium according to claim 1, wherein
a ratio of the diameter of the warp threads of the supporting fabric to the diameter of the warp threads of the filter fabric is greater than or equal to 3.5 (≥3.5).

4. The belt filter medium according to claim 1, wherein
a ratio of the diameter of the weft thread of the supporting fabric to the diameter of the weft thread of the filter fabric is greater than or equal to 2.5 (≥2.5).

5. The belt filter medium according to claim 1, wherein
the thread count of the filter fabric amounts to 10 to 240 threads/cm.

6. The belt filter medium according to claim 1, wherein
the filter fabric has a twill weave or a satin weave.

7. The belt filter medium according to claim 1, wherein
the supporting fabric is exclusively formed of monofilament yarns and
in that the filter fabric is formed of multifilament yarns and/or monofilament yarns.

8. The belt filter medium according to claim 6, wherein
the further thread system has a multifilament yarn or a monofilament yarn.

9. The belt filter medium according to claim 1, wherein
the filter medium has a weight of 300 g per m² and greater.

10. The belt filter medium according to claim 1, wherein
the supporting fabric has a twill weave or a plain weave.

* * * * *